United States Patent Office 3,823,125
Patented July 9, 1974

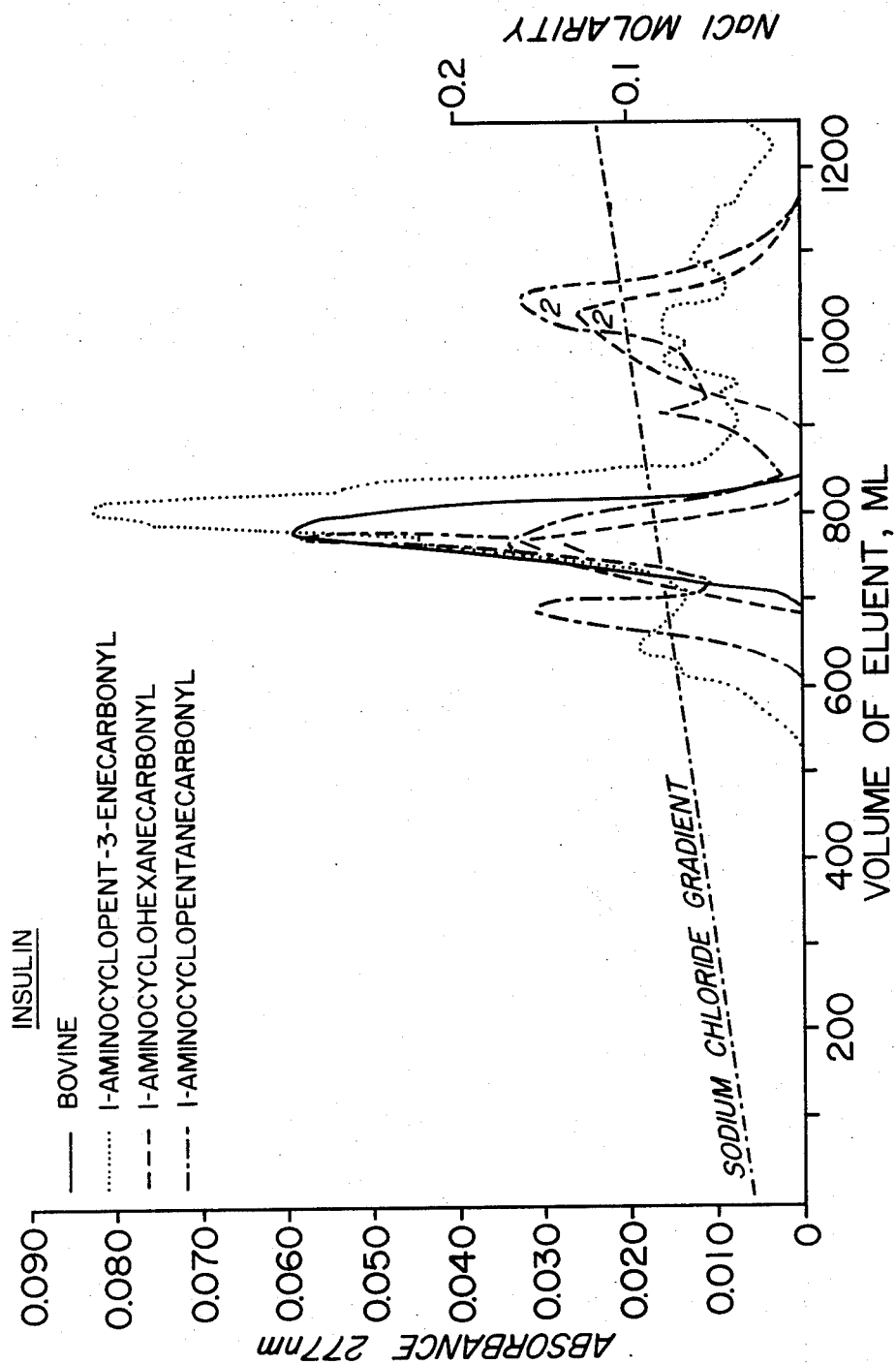

3,823,125
N-AMINOACYL-SUBSTITUTED INSULINS
Norman H. Grant, Wynnewood, Harvey E. Alburn, West Chester, and Richard L. Fenichel, Wyncote, Pa., assignors to American Home Products Corporation, New York, N.Y.
Continuation-in-part of application Ser. No. 866,271, Oct. 14, 1969, which is a continuation-in-part of application Ser. No. 702,245, Feb. 1, 1968, both now abandoned.
This application Oct. 12, 1971, Ser. No. 188,504
Int. Cl. C07c 103/52
U.S. Cl. 260—112.7
4 Claims

ABSTRACT OF THE DISCLOSURE

Novel aminoacyl-substituted insulins, especially 1-aminocyclopentanecarbonyl-, 1 - aminocyclohexanecarbonyl-, and 1-aminocyclopent-3-ene-carbonyl-insulins (I) are prepared by treating insulin with an aminoacylating agent, especially the corresponding N-carboxyanhydrides (II) of 1-aminocyclopentanecarboxylic acid, 1-aminocyclohexanecarboxylic acid and 1-aminocyclopent-3-ene-carboxylic acid. The new compounds (I) have hypoglycemic activity and are useful to treat diabetes.

---

This is a continuation-in-part of our copending application, Ser. No. 866,271, filed Oct. 14, 1969, which is a continuation-in-part of Ser. No. 702,245, filed Feb. 1, 1968, now abandoned.

This invention relates to derivatives of insulin, which have therapeutic activity. More particularly, it relates to aminoacyl-substituted insulins with blood sugar lowering activity.

Background of the Invention

The use of insulin as an agent to lower blood sugar and control diabetes is a matter of common knowledge and experience. However, insulin itself is unstable and dosage forms containing it must be kept under refrigeration and stabilized by the addition of materials which can cause adverse side reactions in some susceptible individuals. Furthermore, insulin has a rather short duration of action, of only about six to eight hours, requiring multiple administration during the day. The insulin hormone has been modified by forming derivatives thereof, such as zinc complexes, protamine zinc complexes, and the like; and these do indeed provide longer durations of activity, but they are difficult to manufacture because particle size controls the duration of activity, and difficult to use, because it is essential to disperse the active materials before administration. In addition, numerous instances are known of diabetic subjects not readily maintained on regular doses of present forms of insulin. Some subjects develop what appears to be an insulin resistance. This is overcome by administration of unusually high doses of the present types of insulin. The resistance appears to result from the development of antibodies which seem to inactivate the present types of insulin. Thus a need exists for forms of insulin which are highly effective as hypoglycemic agents in the treatment of diabetes; which have long durations of activity coupled with quick onsets of action; which are well tolerated by the subject; and which are less antigenic than the present types of insulin. Such compounds are now provided by this invention.

Description of the Drawing

The attached drawing is a graphical representation of the data obtained by separating 1-aminocyclohexanecarbonyl insulin, 1-aminocyclopentanecarbonyl insulin and 1-aminocyclopent-3-enecarbonyl insulin by DEAE-Sephadex chromatography with 0.01 M Tris buffer and 7M urea using a 0.03–0.30M NaCl gradient, pH 7.5. On the ordinate is plotted the absorbance at 277 nm which is a measure of protein concentration. On the abscissa is plotted the volume of eluent in milliliters.

Description of the Invention

The compounds of this invention are, in essence: an aminoacyl-substituted insulin wherein the said aminoacyl group is 1-aminocyclopentanecarbonyl, i.e.,

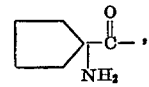

1-aminocyclohexanecarbonyl, i.e.,

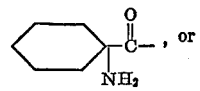, or 1-aminocyclopent-3-ene-carbonyl, i.e.,

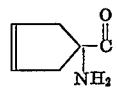

Thus, the invention in its embodiments includes 1-aminocyclopentane-carbonyl insulin, 1-aminocyclohexanecarbonyl insulin, and 1-aminocyclopent-3-enecarbonyl insulin.

When the term "aminoacyl-substituted" is used herein and in the appended claims it contemplates substitution of one aminoacyl group at a free N-terminal position of the insulin molecule (monomer), or four aminoacyl groups in the insulin macromolecule, (tetramolecular complex). Oxygen-substituted aminoacyl insulins are not contemplated by this invention. By "N-terminal position" is meant the nitrogen atom of a terminal free amino group of insulin.

Insulin is a complex molecule with a relatively high molecular weight (about 6,000) and each molecule of the hormone contains three free N-terminal positions (i.e. free amino groups). [The Merck Index, Eighth Edition, April 1968, pages 567–568.] In aqueous solution at various pH levels, insulin polymerizes to form macromolecules (molecular complex). [Martin, Remington's Practice of Pharmacy, Thirteenth Edition, Mack Publishing Co., Easton, Pa., 1965, pages 1045–1046.] At a pH of about 7.5 insulin exists as a tetramolecular complex and demonstrates an apparent or effective molecular weight of about 24,000. Each such macromolecule (tetramolecular complex) thus contains twelve free N-terminal positions at neutral pH [M. E Krahl, "The Action of Insulin on Cells"; New York, Academic Press, page 160 (1961)]. These are the N-terminal positions (i.e. free amino groups) which can react with an acylating agent.

More particularly, with reference to the structure of insulin, as disclosed, for example, by T. E. Prout in Metabolism, 12, 673 (1963), at page 674, the three amino groups which may be acylated according to this invention are those of glycine (in position A–1), phenylalanine (B–1) and lysine (B–29). Because of steric inhibitions, no acylation occurs in the guanidino group of arginine (B–22) and the imidazole rings of histidine (B–5 and B–10). Since at neutral pH, there are 4 basic units (each comprising one A-chain and one B-chain) associated per insulin macromolecule (tetramolecular complex), 12 primary amino groups, those of four (A–1) glycines, four (B–1) phenylalanines and four (B–29) lysines, may be acylated in each macromolecule of the instant compounds.

In their studies of the spatial arrangement of the insulin molecule, Arquilla et al. in Diabetes, 18, 193 (1969) reported that for α-amino acid addition to insulin the B–1 position (phenylalanine) is the most readily available position, the A-1 (glycine) is the second most available position, and the B-29 position (lysine) is the most difficult site for amino acid addition. Lindsay and Shall, Biochem. J. 121, 737 (1971) have shown that acetylation of insulin with N-hydroxy-succinimide acetate gives three monosubstituted products, two disubstituted products, and one trisubstituted product, depending upon whether excess reagent is used and the pH at which the reaction is performed. At pH 8.5, their evidence suggests that the order of reactivity of the reactive amino acids residue of insulin are glycine>phenylalanine≈lysine, and at pH 6.9 the order of reactivity is glycine≈phenylalanine≫lysine.

Those skilled in the art consider DEAE-Sephadex column chromatography to be a very sensitive method for the separation of different forms of insulin. Using this technique to separate the aminoacyl-substituted insulins prepared by the processes herein described, it was found that the 1-aminocyclohexanecarbonyl and the 1-aminocyclopentanecarbonyl insulin products are essentially homogeneous except for the presence of unreacted insulin. The 1-aminocyclopent-3-ene-carbonyl insulin product was found to be essentially homogeneous with no unreacted insulin present. When the bovine insulin used as starting material for the acylation reactions was subjected to DEAE-Sephadex chromatography it was found to be essentially homogeneous.

The aminoacyl-substituted insulins have been shown to contain one acyl group per insulin molecule (monomer) or four acyl groups per insulin macromolecule (tetramolecular complex) by quantitative determination of the appropriate 1-aminocycloalkyl-carboxylic acid by gas chromatographic analysis of the hydrolysate derived from each modified insulin. Thus, when 1-aminocyclopentanecarboxylic insulin or 1-aminocyclopent-3-enecarbonyl insulin is hydrolysed and each hydrolysate quantitatively analysed by gas chromatography for 1-aminocyclopentanecarboxylic acid or 1-aminocyclopent-3-enecarboxylic acid, respectively, the amount of acids found are consistent with the theoretical amounts calculated for one mole of acid per mole of insulin.

All of the acyl-substituted insulins give negative ninhydrin reactions.

The insulin used herein as starting material can be from any of the usual sources, commonly employed. For example, beef insulin, pork insulin, whale insulin and the like may be used. An illustrative starting material is crystalline bovine insulin (approximately 25 I.U./mg.), which is a standard item of commerce.

The new aminoacyl-substituted insulins of the invention are prepared by the following reaction:

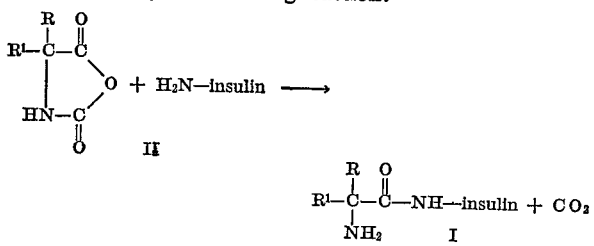

wherein

R and R¹ together are —$CH_2(CH_2)_2CH_2$—;
R and R¹ together are —$CH_2(CH_2)_3CH_2$—;
R and R¹ together are —$CH_2$—$CH=CH$—$CH_2$—; and
$H_2N$— represents a free N-terminal position of the insulin molecule, i.e. a free amino group.

The conditions required for converting the NCA's of Formula II to the instant aminoacyl-substituted insulins of Formula I are not particularly critical. Thus, for example, it is convenient to use from about one-twentieth to about one-half parts by weight of NCA per part by weight of insulin (this provides a stoichiometric excess of the aminoacylating agent). The reaction occurs smoothly and completely at a pH of from about 7.5 to 8.5 in buffer, such as 0.1 M potassium phosphate and even at 0° C., preferably in a nitrogen atmosphere. While the aminoacylating agent can be added all at once (initially), it is preferred to add it portionwise, at intervals of about 15 minutes, until all has been added. The product is obtained after dialyzing against water and freeze-drying the retentate.

The N-carboxyanhydrides of amino acids of Formula II can be prepared by techniques familiar to those skilled in the art. Reference is made, for example, to the phosgenation of 1-aminocyclopentanecarboxylic acid and 1-aminocyclohexanecarboxylic acid, discussed in detail by Norman H. Grant and Harvey E. Alburn in U.S. 3,268,513 and the section by Greenstein and Winitz in "Chemistry of Amino Acids," 1961, John Wiley and Sons, Inc., New York, N.Y., Vol. II, regarding N-carboxyamino acid anhydrides. 1-Aminocyclopent-3-enecarboxylic acid is described in U.S. Pat. 3,594,413.

The compounds of the invention in standard pharmacological tests exhibit significant and long-acting hypoglycemic activity with decreased antigenicity (antibody affinity).

The instant compounds can be administered in a variety of injectable dosage forms. As with insulin, the route of administration determines the duration and rapidity of action. Injections can be given aseptically by the subcutaneous route, although intravenous or intramuscular injections can be employed to insure rapid action. A convenient site of subcutaneous administration is the thigh.

The daily dose requirements vary with the particular composition being employed, the severity of symptoms being presented, and the animal, such as valuable domestic animals, or laboratory animals, such as mice, rats or monkeys, being treated. The dosage also varies with the size of the patient. Dosage is calculated on a unit basis in the same way as the dosage of crystalline zinc insulin. With a mammal of about 70 kilogram body weight, for example, the ordinarily effective dose is from about 1 to about 200 units per day. "Units" are U.S.P. Insulin Units. Of course, as in the case of insulin, each subject requires individual study to determine the most efficacious time, number, and amount of individual daily doses. As with insulin, blood sugar and urine sugar estimations provide a guide for therapy with the instant compositions, the therapeutic objective being to lower the blood sugar level to normal, then to maintain it.

For dosages, the instant compounds are formulated into a variety of largely aqueous dosage forms containing various electrolytes, buffers, stabilizers and the like. Thus, for example, the aqueous suspension of the instant compounds can contain sodium chloride, sodium acetate, methyl para-hydroxybenzoate, glycerin, dibasic sodium phosphate, small stabilizing amounts of phenol, meta-cresol and the like. An especially useful dosage unit form comprises 20, 40, or 80 units/ml. in sterile physiological saline.

Description of the Preferred Embodiments

The following examples are intended to describe new compounds within the scope of this invention and means to obtain them. They are merely illustrative and are not to be construed to limit the claims in any manner whatsoever.

EXAMPLE I

1-Aminocyclopentanecarbonyl-Insulin

A solution of insulin is prepared by dissolving 500 mg. in 250 ml. of 0.05 M phosphate buffer (pH 8.0) at about 22° C. Forty mg. of N-carboxy-1-aminocyclopentane carboxylic acid anhydride (NCA) is added. After complete solution is achieved, the reaction mixture is chilled to 5° C. and an additional 40 mg. of the NCA is added. The mixture is stirred for another 2 hours, freeze-dried, the residue is resuspended in 50 ml. of water and this is dialyzed against three 4-liter volumes of water. The retentate is freeze-dried (lyophilized) to provide 520 mg. of the product as the residue.

EXAMPLE II

1-Aminocyclohexanecarbonyl-Insulin

A solution of insulin is prepared by dissolving 500 mg. in 250 ml. of 0.05 M $K_2HPO_4$ buffer, adjusting the pH to 9.5 until complete solution is achieved, and finally returning the pH to 8.0. At room temperature 40 mg. of N-carboxy-1-aminocyclohexane carboxylic acid anhydride (NCA) is added. After the NCA is dissolved, an additional 40 mg. of NCA is added. The mixture then is stirred for 2 hours at 5° C. and lyophilized. It is reconstituted in 50 ml. of water, dialyzed against three 4-liter volumes of water, and the retentate is freeze-dried, leaving the product as the residue.

EXAMPLE III

1-Aminocyclopent-3-enecarbonyl-Insulin

An insulin solution is prepared by solubilizing 250 mg. of Bovine crystalline insulin in 50 ml. of 0.1 M $K_2HPO_4$-7M urea solution at a pH of 10. As soon as the insulin is completely solubilized, the pH is adjusted to 8.0 with HCl. The solubilized solution is placed in an ice bath and is equilibrated with stirring to 0°–2° C. and 10 mg. of N-carboxy-1-aminocyclopent-3-enecarboxylic acid anhydride is added to the stirred solution and the stirring is continued for thirty-five minutes. The stirred mixture is then dialyzed mechanically against two 13 liter aliquots, changed after one hour, of cold distilled water. The insulin solution is then dialyzed statically against a fresh, cold 13 liter aliquot of distilled water followed by a five hour dialysis against a fresh 13 liter of cold distilled water followed by lyophilizing. A 70 to 100 percent yield is obtained.

EXAMPLE IV

Hydrolysis of Aminoacyl-Substituted Insulins

Samples of the products of Examples I and III are hydrolyzed with 6N hydrochloric acid for 11 hours at 110 °C. under nitrogen. The hydrolysates are then subjected to analysis by gas-liquid chromatography using the method of Janssen et al., *Anal. Biochem* 30, 217 (1969). With the product of Example I, 21 µg. mg. of 1-aminocyclopentanecarboxylic acid was found. With the product of Example III, 17 µg./mg. of 1-aminocyclopent-3-enecarboxylic acid was found. For one carboxylic acid residue per molecule of insulin, the theoretical amount of acid is about 22 µg./mg.

When the purified fraction of 1-aminocyclopentanecarboxylic insulin of Example V (obtained by chromatography) was hydrolyzed and analysed as described above, 15 µg./mg. of 1-aminocyclopentanecarboxylic acid was found.

EXAMPLE V

Fractionation of Aminoacyl-Substituted Insulins

The product of Examples I, II, and III are subjected to column chromatography on DEAE-Sephadex-A25 according to the method described by D. Levy and F. Carpenter in *Biochemistry*, 6, 3559 (1967) which is a modification of the procedure described by W. Bromer and R. Chance, *Biochem. Biophys. Acta*, 133, 219 (1967). The insulins (7 mg.) are dissolved in 1.4 ml. of 0.01 M Tris-0.03 M sodium chloride in 7M urea and the solutions placed on 2.5× 30 cm. columns equilibrated with the same buffer. Elution is carried out with a linear gradient (0.3M sodium chloride run into the stirred reservoir containing 0.03M sodium chloride, both solutions in 7M–urea-0.01 M *Tris.* at pH 7.5) and flow rates of 70–75 ml. per hour.

Protein is determined by measuring absorbence at 277 nm. with a Beckman DU Spectrophotometer. The results of the separations are shown in the attached drawing.

EXAMPLE VI

In the evaluation of the hypoglycemic compounds of the invention, and to demonstrate their valuable activity, the *in vitro* and *in vivo* effects of the instant compounds were tested as follows:

The concentration dependent mitochondrial swelling activity of aminoacyl-substituted insulins, which activity is a measure of hypoglycemic activity, was determined as follows:

Rat liver mitochondria were prepared in 0.25 M sucrose solution containing 0.001 M ethylenediamine tetraacetic acid (EDTA) according to a standardized differential centrifugation procedure. The effect of the new insulins on mitochondrial swelling of freshly isolated rat liver mitochondria suspended in 0.125 M KCl-0.02M tris (hydroxymethylamino) methane-0.1% partially hydrolyzed gelatin solution at pH 7.3 was measured by following changes in light absorption at 520 mµ with a Beckman Model B Spectrophotometer. Reference is made to R. L. Fenichel, W. H. Bechman and H. E. Alburn, *Biochemistry*, 5, 461 (1966). The results are summarized in Table I.

TABLE I.—MITOCHONDRIAL SWELLING ACTIVITY OF AMINOACYL-INSULINS

A. Concentration, $1 \times 10^{-5}$ M

|  | Δ O. D. Spon. at 520 mµ | | | |
|---|---|---|---|---|
|  | 10' | 20' | 30' | Total |
| 1-aminocyclopentanecarbonyl-insulin | 75 | 150 | 168 | 393 |
| 1-aminocyclohexanecarbonyl-insulin | 83 | 150 | 148 | 381 |
| 1-aminocyclopent-3-enecarbonyl-insulin | 45 | 75 | 120 | 240 |

B. Concentration, $5 \times 10^{-6}$ M

| -aminocyclopentane-carbonyl-insulin | 57 | 117 | 144 | 318 |
| 1-aminocyclohexanecarbonyl-insulin | 53 | 99 | 140 | 292 |
| 1-aminocyclopent-3-enecarbonyl-insulin | 50 | 75 | 125 | 250 |

C. Concentration, $2.5 \times 10^{-6}$ M

| 1-aminocyclopentanecarbonyl-insulin | 35 | 24 | 5 | 64 |
| 1-aminocyclohexanecarbonyl-insulin | 20 | 59 | 107 | 186 |
| 1-aminocyclopent-3-enecarbonyl-insulin | 10 | 45 | 40 | 95 |

D. Concentration, $1.25 \times 10^{-6}$ M

| 1-aminocyclopentane-carbonyli-nsulin | 17 | 0 | −14 | 3 |
| 1-aminocyclohexanecarbonyl-insulin | 35 | 15 | 48 | 98 |
| 1-aminocyclopent-3-enecarbonyl-insulin | 19 | 28 | 32 | 79 |

The data in Table I show that all of the instant compounds have good concentration dependent activity, the 1-aminocyclohexanecarbonyl insulin being better than the other two at the lowest concentration, $1.25 \times 10^{-6}$ M.

The *in vivo* hypoglycemic activity of the aminoacyl-substituted insulins are determined in comparison with a sham-treated bovine insulin control by carrying out the following procedure [See reference: H. E. Alburn and R. E. Fenichel, *Nature*, 213, 515 (1967)]: Male Sprague Dawley rats are fed *ad libitum* a standard laboratory chow pellet diet (Purina) and fasted 18 hours prior to the experiment. After an initial 0.1 ml. blood sample is obtained from the hearts of the lightly etherized rats, they are given by intraperitoneal injection different concentrations (as units per kiliogram of the said modified insulin, solubilized at pH 8.6, 0.9% saline. A content of 25 units per milligram for each modified preparation is assumed because the unmodified insulin substrate has a content of 25.3 units per mg. Additional blood samples are obtained from the hearts of the animals at regular time intervals for blood glucose analysis. Blood glucose levels are determined by Technicon Autoanalyzer Method N–9.

The results obtained for 1-aminocyclopentanecarbonyl insulin and 1-aminocyclohexanecarbonyl insulin are listed in Table II.

The potency of 1-aminocyclopent-3-enecarbonyl insulin is calculated by comparing the blood glucose values of the compound with those of bovine insulin at 90 and 150 minutes. This gives a potency of 149% (compared to bovine insulin) or 37.3 IU/mg.

TABLE II.—COMPARISON OF THE HYPOGLYCEMIC ACTIVITY OF AMINOACYL-SUBSTITUTED INSULINS WITH BOVINE INSULIN

| Modified insulin | Injection,[a] u./kg. | No. of rats | Blood glucose mg. per 100 ml., mean±S.E. | | | |
|---|---|---|---|---|---|---|
| | | | Control | 30 min. | 90 min. | 150 min. |
| Insulin | 2.50 | 9 | 64±1.6 | 43±2.5 | 35±0.8 | 35±1.3 |
| Bovine insulin [b] | 1.25 | 4 | 79±2.3 | 54±7.4 | 48±2.9 | 51±4.7 |
| Do.[b] | 2.50 | 10 | 72±4.4 | 40±4.3 | 30±1.2 | 23±1.7 |
| 1-aminocyclopentanecarbonyl insulin | 1.00 | 9 | 73±3.1 | 50±2.5 | 38±0.5 | 42±1.0 |
| Do. | 2.50 | 8 | 74±3.6 | 34±2.3 | 32±1.4 | 26±2.5 |
| 1-aminocyclohexanecarbonyl insulin | 1.00 | 7 | 71±3.1 | 61±2.9 | 46±2.4 | 51±2.9 |
| Do. | 2.50 | 6 | 72±3.0 | 47±3.4 | 33±0.7 | 31±1.1 |
| Bovine insulin [c] | 1.00 | 12 | 70±1.6 | 50±2.1 | 41±3.1 | 46±2.5 |
| Do.[c] | 2.50 | 11 | 67±1.6 | 36±3.1 | 33±1.2 | 34±3.7 |

[a] Intraperitoneal injection. All insulins were solubilized in pH 8.6, 0.9% saline.
[b] Insulin treated the same as experimental insulins without addition of reaction reagent.
[c] Untreated bovine crystalline insulin.

The results for 1-aminocyclopent-3-enecarbonyl insulin are shown in Table III.

TABLE III.—COMPARISON OF THE HYPOGLYCEMIC ACTIVITY OF 1-AMINOCYCLOPENT-3-ENECARBONYL INSULIN WITH BOVINE INSULIN

| Insulin | Injection,[a] u./kg. | No. of rats | Blood glucose, mg. per 100 ml., Mean±S.E. | | | | |
|---|---|---|---|---|---|---|---|
| | | | Control | 90 min. | 150 min. | 210 min. | 270 min. |
| 1-aminocyclopent-3-enecarbonyl insulin | 1.00 | 19 | 71±1.9 | 33±0.8 | 36±1.7 | 45±1.6 | 57±1.8 |
| Bovine insulin [b] | 1.00 | 18 | 63±1.7 | 34±0.8 | 42±1.7 | 51±2.1 | 61±2.0 |

[a] Intraperitoneal injection. All insulins were solubilized in pH 8.6, 0.9% saline.
[b] Bovine crystalline insulin.

The average potency of 1-aminocyclopentanecarbonyl insulin and of 1-aminocyclohexanecarbonyl insulin compared to bovine insulin is calculated by statistical analysis of the data in Table II. In these comparisons the ratio of the values of the higher dose to the lower dose is always the same. The regression lines of response (blood glucose content) are obtained and are parallel as indicated by the "t" test. The relative potency R is determined for each time interval for each modified insulin in relation to bovine insulin, and from these values the average potency in percent is calculated (See D. Finney "Statistical Methods in Biological Assay," Charles Griffin and Company, Ltd., London, 1969). The results obtained by the above-described calculations are given in Table IV.

The purified fractions from the chromatographic separation of aminoacyl substituted insulins (described in Example V) are tested *in vivo* according to the above-described procedures. The results compared to bovine crystalline insulin are presented in Table V.

TABLE V.—COMPARISON OF THE HYPOGLYCEMIC ACTIVITY OF PURIFIED FRACTIONS OBTAINED FROM AMINOACYL-SUBSTITUTED INSULINS WITH BOVINE INSULIN

| Modified insulin | Injection,[a] U/kg. | No. of rats | Blood glucose mg. per 100 ml., mean ±S.E. | | | |
|---|---|---|---|---|---|---|
| | | | Control | 30 min. | 90 min. | 150 min. |
| 1-aminocyclohexanecarbonyl insulin, 1st fraction | 2.0 | 5 | 83±3.1 | 57±4.1 | 61±6.4 | 74±7.2 |
| Mean glucose drop, percent of initial value | | | | 31.3 | 26.5 | 10.9 |
| 2d fraction | 2.0 | 2 | 72±2.9 | 65±0.5 | 64±0.7 | 76±1.4 |
| Mean glucose drop, percent of initial value | | | | 9.8 | 11.1 | 5.6 |
| Bovine insulin[c] | 2.0 | 4 | 83±4.3 | 53±4.5 | 50±1.8 | 64±2.1 |
| Mean glucose drop, percent of initial value | | | | 36.2 | 39.8 | 22.9 |
| 1-aminocyclopentanecarbonyl insulin, 1st fraction | 2.0 | 6 | 79±3.2 | 60±5.4 | 39±2.2 | 46±4.0 |
| Mean glucose drop, percent of initial value | | | | 24.1 | 50.6 | 41.7 |
| 2d fraction | 2.0 | 3 | 72±2.8 | 42±2.2 | 57±4.3 | 74±3.4 |
| Mean glucose drop, percent of initial value | | | | 41.6 | 20.8 | [b]2.8 |
| Bovine insulin [c] | 2.0 | 6 | 76±2.3 | 53±2.2 | 45±3.3 | 59±3.0 |
| Mean glucose drop, percent of initial value | | | | 30.3 | 40.9 | 22.4 |

[a] Intraperitoneal injection. All insulins were solubilized in pH 8.6, 0.9% saline.
[b] Percent Increase greater than control value.
[c] Bovine cyrstalline Insulin (Elanco 25.2 U/kg.).

Insulin-stimulated glucose uptake of aminoacyl-substituted insulins is determined by the rat hemidiaphragm method of W. Shaw and E. Shuey, *Biochemistry* 2, 286 (1963) as modified by K. Pruitt *et al.*, *Biochem. Biophys. Acta* 115, 329 (1966). Glycolytic activity in adipose tissue is determined by the method of A. Renold, *et al. J. Clin. Invest.* 39, 1487 (1960). The results of these tests are shown in Table VI.

TABLE IV.—COMPARISON OF AMINOACYL-SUBSTITUTED INSULINS WITH BOVINE INSULIN

| Control | Modified insulin | Time (min.) | Relative potency,[b] percent | Average potency,[b] percent | Potency,[c] IU/mg. |
|---|---|---|---|---|---|
| Bovine insulin [a] | 1-aminocyclopentanecarbonyl insulin | 30 | 108.90 | | |
| | | 90 | 129.30 | 129.46 | 32.3 |
| | | 150 | 150.20 | | |
| Do.[a] | 1-aminocyclohexanecarbonyl insulin | 30 | 49.59 | | |
| | | 90 | 77.90 | 73.17 | 18.3 |
| | | 150 | 92.02 | | |

[a] Untreated bovine crystalline insulin.
[b] Compared to bovine crystalline insulin.
[c] Calculated for basis of bovine crystalline insulin potency, 25 IU/mg.

TABLE VI.—FAT PAD AND HEMI-DIAPHRAGM ASSAYS OF AMINOACYLMODIFIED INSULINS

| Type of insulin | Fat pad activity as percent of beef standard* | Hemi-diaphragm activity as percent of beef standard* |
|---|---|---|
| 1-aminocyclopentanecarbonyl insulin | 71.1 | 93.5 |
| 1-aminocyclohexanecarbonyl insulin | 132.5 | 132.6 |

*Beef insulin standard equals 100%.

1-Aminocyclohexanecarbonyl insulin and 1-aminocyclopentanecarbonyl insulin are subjected to immunoassay *in vitro* according to the two antibody method of C. Morgan and A. Lazarow, *Diabetes, 12,* 115 (1963). The results are listed in Table VII.

TABLE VII

Immuno Assay of Aminoacyl-Substituted Insulins

| Type of Insulin | Percent Recovery of Pork Insulin Standard* |
|---|---|
| 1-Aminocyclopentanecarbonyl Insulin | 69 |
| 1-Aminocyclohexanecarbonyl Insulin | 69 |

*Pork Insulin Standard equals 100%

We claim:

1. A mono (aminoacyl)-substituted insulin wherein said aminoacyl group is 1-aminocyclohexanecarbonyl, 1-aminocyclopentanecarbonyl, or 1-aminocyclopent-3-ene-carbonyl, the aminoacyl group being substituted at one of the N-terminal amino groups of phenylalanine, glycine, or lysine of the insulin molecule.
2. A substituted insulin as defined in Claim 1, wherein the aminoacyl group is 1-aminocyclopentanecarbonyl.
3. A substituted insulin as defined in Claim 1, wherein the aminoacyl group is 1-aminocyclohexanecarbonyl.
4. A substituted insulin as defined in Claim 1, wherein the aminoacyl group is 1-aminocyclopent-3-enecarbonyl.

References Cited

UNITED STATES PATENTS

| 3,481,917 | 12/1969 | Grant et al. | 260—112.7 |
| 3,591,574 | 7/1971 | Fenichel et al. | 260—112.7 |
| 3,684,791 | 8/1972 | Geiger et al. | 260—112.7 |

ELBERT L. ROBERTS, Primary Examiner

U.S. Cl. X.R.

424—178